United States Patent
Zhang et al.

(10) Patent No.: US 7,881,569 B2
(45) Date of Patent: Feb. 1, 2011

(54) TWO-CHANNEL PLASTIC OPTICAL FIBER (POF) ROTARY JOINT

(75) Inventors: Boying B Zhang, Pennington, NJ (US); Hong Zhang, Pennington, NJ (US)

(73) Assignee: Princetel, Inc., Pennington, NJ (US)

( * ) Notice: Subject to any disclaimer, the term of this patent is extended or adjusted under 35 U.S.C. 154(b) by 159 days.

(21) Appl. No.: 12/434,930

(22) Filed: May 4, 2009

(65) Prior Publication Data

US 2009/0310911 A1    Dec. 17, 2009

Related U.S. Application Data

(60) Provisional application No. 61/073,082, filed on Jun. 17, 2008.

(51) Int. Cl.
*G02B 6/26* (2006.01)
(52) U.S. Cl. ............................ 385/26; 385/115; 385/34
(58) Field of Classification Search ................ 385/26, 385/115, 34
See application file for complete search history.

(56) References Cited

U.S. PATENT DOCUMENTS

| | | | |
|---|---|---|---|
| 4,401,360 A | 8/1983 | Streckmann et al. | |
| 4,725,116 A | 2/1988 | Spencer et al. | |
| 4,842,355 A | 6/1989 | Gold et al. | |
| 5,588,077 A | 12/1996 | Woodside | |
| 5,692,081 A * | 11/1997 | Takahashi | 385/78 |
| 5,768,458 A * | 6/1998 | Ro et al. | 385/79 |
| 6,190,616 B1 * | 2/2001 | Jovanovich et al. | 422/103 |
| 6,198,858 B1 * | 3/2001 | Pan et al. | 385/24 |
| 6,736,547 B2 * | 5/2004 | Stevens et al. | 385/61 |
| 2003/0063864 A1 * | 4/2003 | Qin et al. | 385/74 |

* cited by examiner

*Primary Examiner*—Ellen Kim

(57) ABSTRACT

The present invention connects two independent plastic optical fiber channels simultaneously, in which optic signals can be transmitted along two optic passes through a single mechanical rotational interface. The first channel of light path consists of a pair of plastic optic fibers with larger-core, co-axially fixed in 2 holders respectively. The light signal from one of the fiber can be directly coupled into another fiber. A number of smaller-core plastic optic fibers for second channel of light path are circumferentially arranged in the peripheral space of the first channel fibers. They are blind-spot free during rotation and are ideal for machine control applications such as SERCOS Interfaces. The rugged design permits underwater usage. Damaged fibers can be easily replaced without costly repairs of the device itself.

3 Claims, 5 Drawing Sheets

TWO-CHANNEL PLASTIC OPTICAL FIBER (POF) ROTARY JOINT

This application claims priority of U.S. Provisional Patent Application No. 61/073,082, filed date: Jun. 17, 2008

BACKGROUND OF THE INVENTION

1. Field of the Invention

The present invention relates generally to the field of apparatus for fiber optical communication, and more particularly, to a two-channel plastic optical fiber (POF) rotary joint.

2. Description of Related Art typical fiber optical rotary joint consists of a fixed fiber holder and a rotatable fiber holder which are relatively rotatable each other to allow uninterrupted transmission of optical signals through the rotational interface from fibers on any one of the holders to the fibers on another holder.

There are three types of optical fiber commonly used: single mode glass fiber, multimode glass fiber and plastic optical fiber (POF). Glass fibers which support many propagation paths or transverse modes are called multimode fibers. Fibers which support only a single mode are called single mode fibers. Multimode fibers generally have a large-diameter core, and are used for short-distance communication links or for applications where high power must be transmitted. Single mode fibers are used for most communication links longer than 200 meters.

Plastic optical fibers possess a few important characters that make them favorite choices for certain short-distance fiber optical applications. Their large cores allow easy light coupling. Termination can be simplified to quick hot knife cutting or diamond turning. They are bend insensitive and do not fatigue easily.

A couple of prior inventions of two channel fiber optic rotary joint are descried in the following patents: U.S. Pat. No. 5,588,077, U.S. Pat. No. 4,842,355, and U.S. Pat. No. 4,725,116.

In U.S. Pat. No. 5,588,077, the two optic channels are arranged in-line along the same rotational axis. Isolation of one channel from the other is achieved through a novel application of gradient index rod lenses of suitable pitch. A pair of lenses is arranged adjacent each other on each side of the rotational interface and a second pair of axially aligned lenses is arranged outboard of the first pair. Gold, et al designed another two channel FORJ in U.S. Pat. No. 4,842,355. A first channel signal is delivered to an optic fiber transmitted coaxially of the stationary and rotary side, transfer across the rotational plane between the two components being accomplished by opposing centrally located optic lenses. A second channel transmitted through a second optic fiber is delivered to a lens system which converts the light into a cylinder of light coaxial with the first channel and which surrounds the optic management for the first channel. Second channel thus are converted into coaxial hollow cylinders of light. These cylinders of light are transmitted between facing lens systems in the rotary and stationary sides of the apparatus. But the facing lens systems are very difficult to be fabricated.

Spencer, et al shows in U.S. Pat. No. 4,725,116 a two-channel and multi-channel FORJ. Within the joint reflecting surface are used to redirect off-axis optic signals onto the joint axis, with relative rotation occurring while the signals are on-axis. A rotating member for each channel has a reflecting surface for reflecting the on-axis signal portion off-axis to a receptor fiber. Alignment between the rotating member and the receptor fiber, as well as drive for the rotating member, is provided by a pair of magnets of opposite polarity, one being secured to the rotating member and the other being secured to the rotor. But it could be very difficult for the magnetic interaction to accurately ensure the synchronous rotation of the rotor and the rotating member. The size of the magnetic element and the adjustment of the reflecting surface also increase the size of the invented embodiment.

Unfortunately, almost all the prior arts of fiber optical rotary joints are hardly used for plastic fiber applications.

SUMMARY OF THE INVENTION

The first object of the present invention is to utilize the plastic optic fibers, to realize a two channel fiber optic rotary joints which can simultaneously transmit optic signals through a single mechanical rotational interface with a very low-profile and compact structure.

Another object of the present invention to minimize the need for maintaining precise axial alignment between the rotating and non-rotating elements of a two channel fiber optic rotary joint so that it could be used in any harsh environments such as temperature change, vibration and shock.

DESCRIPTION OF THE INVENTION

Figure 1:
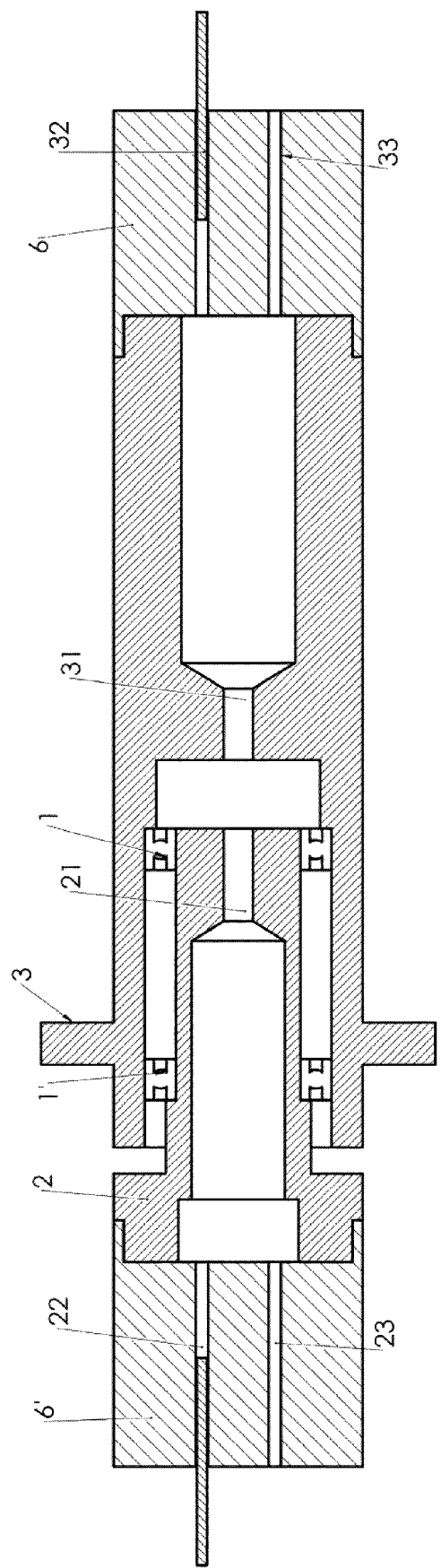
FIG. 1 shows a cross section view of the mechanical embodiment of present invention.

Refers to FIG. 1, a preferred mechanical embodiment of the present invention consists of a rotatable component 2 with a central hole 21, a fixed component 3 with a central hole 31, a pair of bearing 1 and 1' to enable the component 2 and 3 rotatable relatively. The rotatable component 2 further comprises fiber holder 6' which has two coupling holes 22 and 23. The fixed component 3 further comprises fiber holder 6 which has two coupling holes 32 and 33. The axis of the rotation is the geometrical axis of the component 2 and 3.

Figure 2:
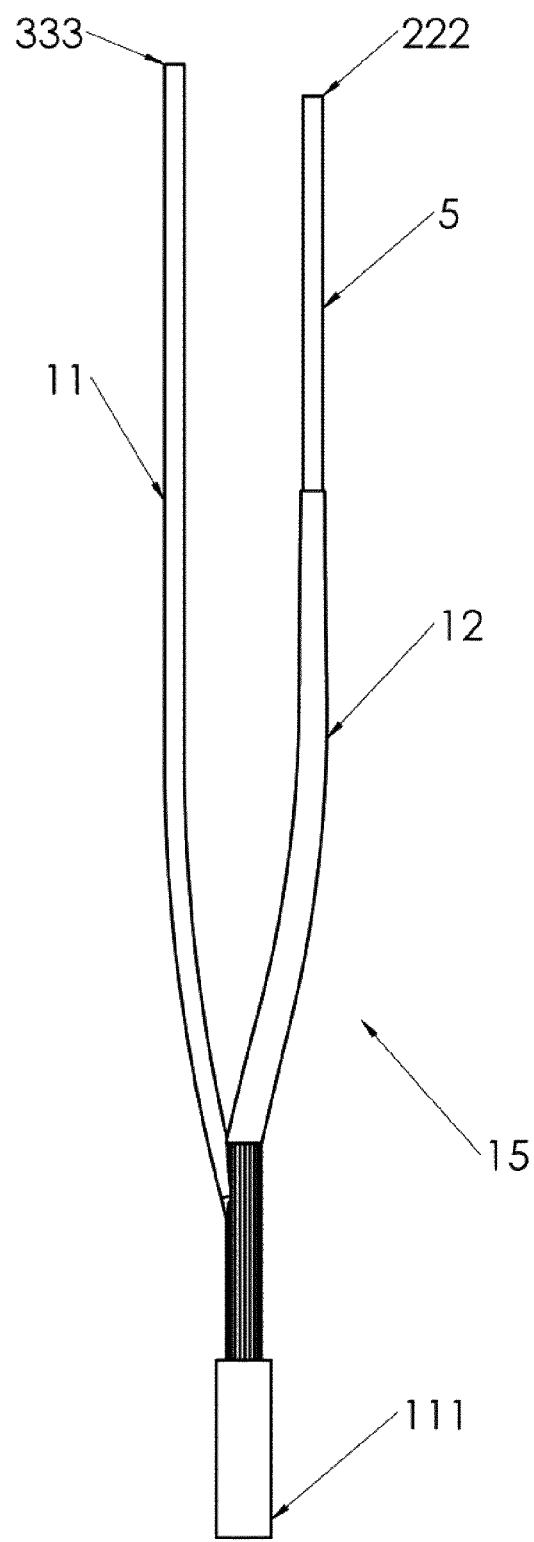
FIG. 2 illustrates the "Y" shaped plastic optical fiber bundle assembly in the present invention.

As shown in FIG. 2, a typical "Y" shaped plastic optical fiber bundle assembly 15 (or 15') has its bottom side 111 (or 111'), the first top side 333 (or 333') and second top side 222 (or 222'). The "Y" shaped plastic optical fiber bundle assembly 15 (or 15') includes a large-core plastic fiber 11 (or 11'), a group of small-core plastic fibers 12 (or 12') and a coupling fiber 5 (or 5'). Said large-core plastic fiber 11 (or 11') has its front portion and end portion, wherein said front portion being secured in the center of the bottom side of "Y" shaped plastic optical fiber bundle assembly 15 (or 15') and said end portion being secured on the first top side 333 (or 333') of "Y" shaped plastic optical fiber bundle assembly 15 (or 15'). Said a group of smaller-core plastic optical fibers 12 (or 12') have a front side and back side; and wherein said front side of 12 (or 12') being circumferentially arranged around the peripheral space of the said front portion of said larger-core plastic optical fiber on the bottom side of "Y" shaped plastic optical fiber bundle assembly 15 (or 15') and said back side of 12 (or 12') being secured on the second top side 222 (or 222') of said "Y" shaped plastic optical fiber bundle assembly 15 (or 15'). Said coupling plastic optical fiber 5 (or 5') is a piece of larger-core plastic optical fiber with inside portion and outside portion; and wherein said inside portion of coupling plastic optical fiber 5 (or 5') being secured in the second top side 222 (or 222') of said "Y" shaped plastic optical fiber bundle assembly 15 (or 15') and facing oppositely with the back side of said group of smaller-core plastic optical fibers 12 (or 12'); while the said outside portion of coupling plastic optical fiber 5 (or 5') being protruded out of the said second top side of said "Y" shaped plastic optical fiber bundle assembly 15 (or 15').

Figure 3:
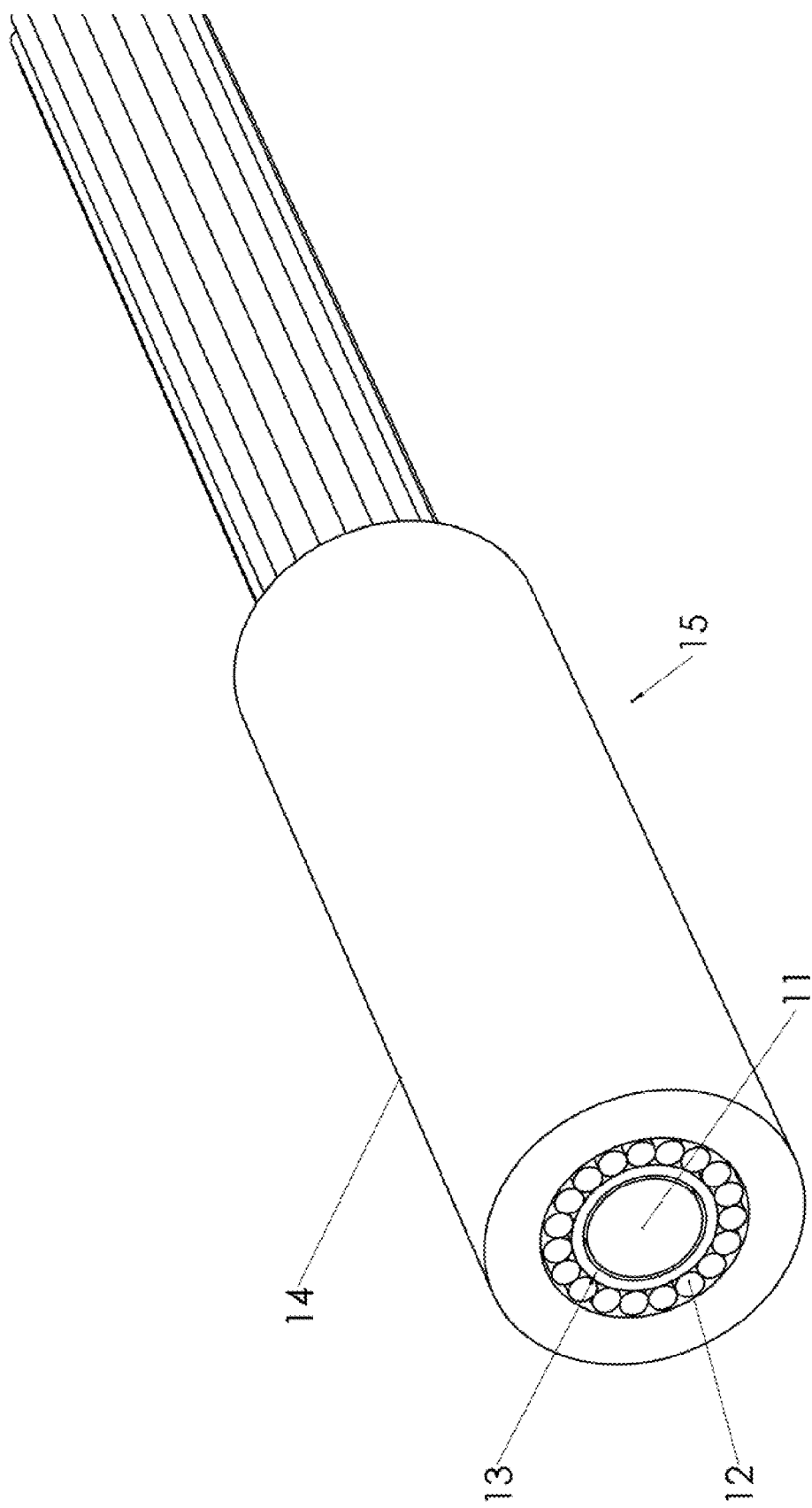
FIG. 3 is an enlarged front side view of the "Y" shaped plastic optical fiber bundle assembly in the present invention.

Refers to FIG. 3, the detailed construction of the bottom side of the "Y" shaped plastic optical fiber bundle assembly 15 (or 15') is illustrated. In this embodiment, the annular component 13 (or 13') is a thin wall tube to hold the larger-core plastic fiber. Another annular component 14 (or 14') is the holder for the bottom side of the "Y" shaped plastic optical fiber bundle assembly 15 (or 15'), which is coaxially arranged with 13 (or 13'). The radial clearance between the external diameter of 13 (or 13') and internal diameter of 14 (or 14') is equal to the diameter of smaller-core plastic fiber 12 (or 12') so that a number of smaller-core plastic optic fiber 12 (or 12') can be circumferentially arranged in the peripheral clearance space.

Figure 4:
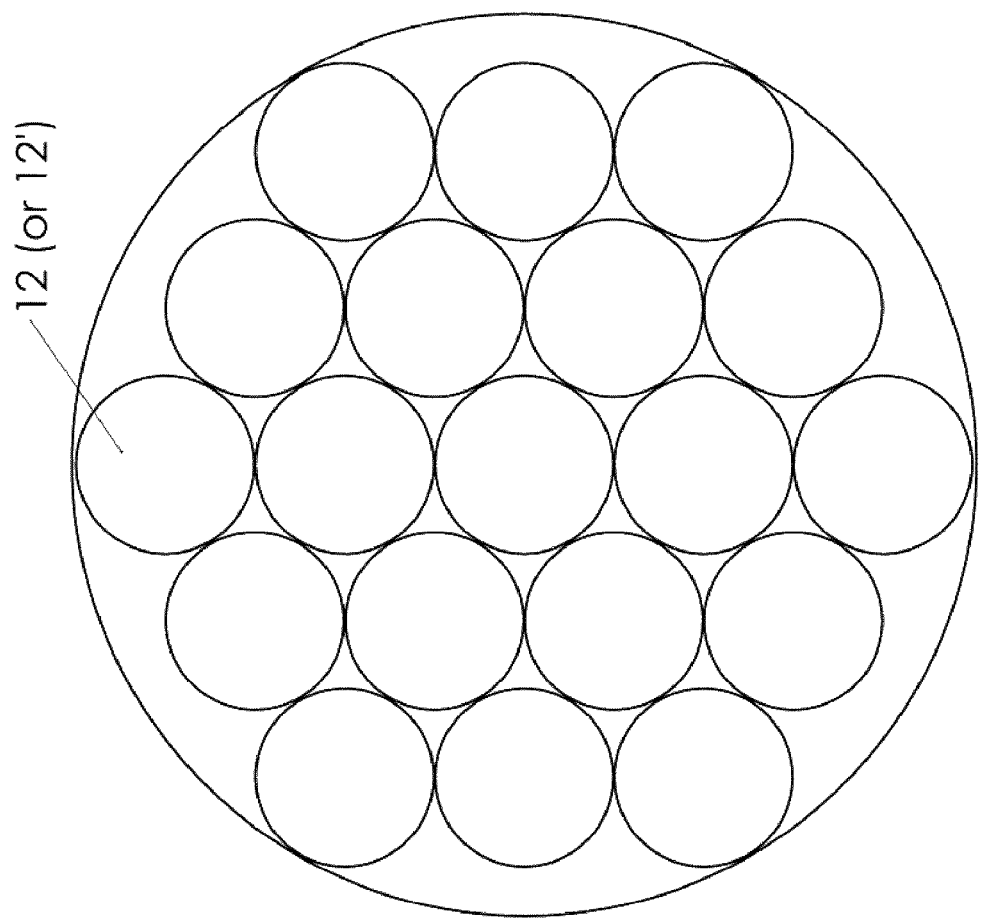
FIG. 4 is back side view of the "Y" shaped plastic optical fiber bundle assembly in the present invention.

FIG. 4 shows the back side of a group of small-core plastic fibers 12 (or 12'). In this embodiment, nineteen small-core plastic fibers are arranged in a circle with the same diameter as that of the coupling fiber 5 (or 5').

Figure 5:
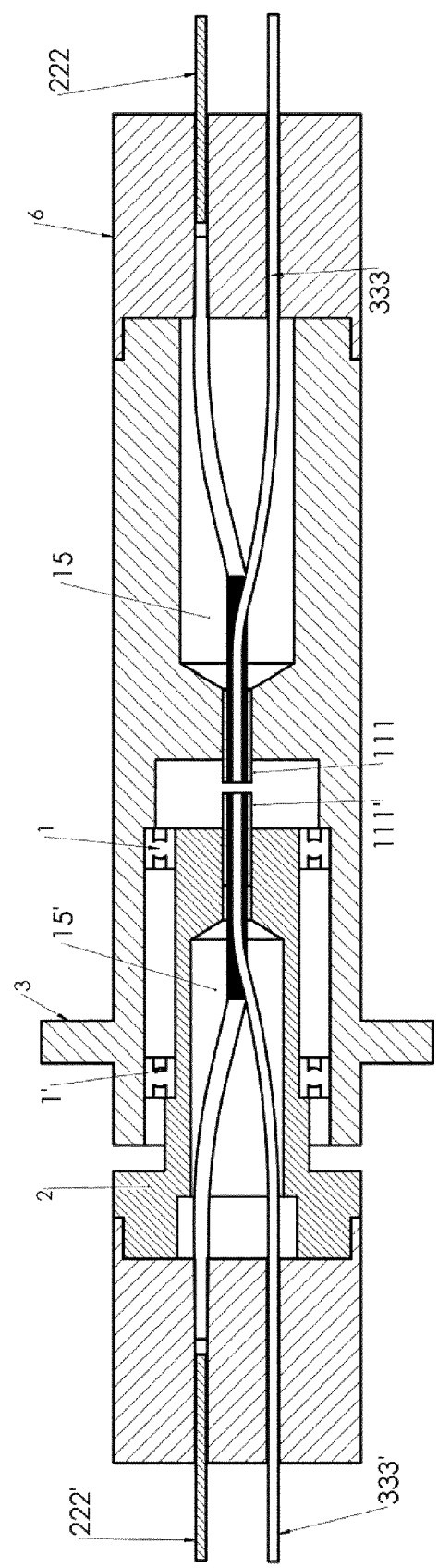
FIG. 5 shows a cross section view of the basic embodiment of present invention.

Refers to FIG. 5, a preferred basic embodiment of the present invention consists of said mechanical embodiment (see FIG. 1) and a first "Y" shaped plastic optical fiber bundle assembly 15 as well as a second "Y" shaped plastic optical fiber bundle assembly 15'. The bottom side 111 of the first "Y" shaped plastic optical fiber bundle assembly 15 being secured in the central hole 31 of the fixed component 3, while the top side of 15 being secured in the two coupling holes 32 and 33 of the fixed component 3 respectively. The bottom side 111' of the second "Y" shaped plastic optical fiber bundle assembly 15' being secured in the central hole 21 of the rotatable component 2, while the top side of 15' being secured in the two coupling holes 22 and 23 of the rotatable component 2 respectively.

The first channel of light path having said large-core plastic fibers 11 and 11'. The front portion of 11 and 11' are separated by a very mall space. A light signal from one of said large-core plastic fiber 11 (or 11') directly coupled into another large-core plastic fiber 11' (or 11) through the rotational interface between the bottom sides of the fiber bundle 15 and 15'. The second channel of light path including said a group of smaller-core plastic fiber bundle 12,12' and the large-core coupling fiber 5 as well as 5'. The second channel light signal entered from one of the said large-core coupling fiber 5 (or 5') would be coupled to the back side of the smaller-core plastic fiber bundle 12 (or 12') in the hole 32 (or 22) of the fiber holder 6 (or 6') then dynamically coupled into another smaller-core plastic fiber bundle 12' (or 12) on the front sides of the fiber bundle 15 and 15' and finally from the back side of the smaller-core plastic fiber bundle 12' (or 12) coupled into another large-core coupling fiber 5' (or 5) in the hole 22 (or 32) of the fiber holder 6' (or 6).

What is claimed is:

1. A two-channel fiber optic rotary joint for optic signal transmissions comprising:

a pair of relatively rotatable fiber holders with a common rotary axis, and wherein each one of said fiber holders further comprising a central hole and two coupling holes;

a pair of bearings to enable the said fiber holders rotate relatively;

a first "Y" shaped plastic optical fiber bundle assemblies with the bottom side of "Y" shape being secured in the central hole of one of said rotatable fiber holders, while the top side of "Y" shape being secured in the two coupling holes of said one of the rotatable fiber holder respectively; and a second "Y" shaped plastic optical fiber bundle assemblies with the bottom side of "Y" shape being secured in the central hole of another said rotatable fiber holders, while the top side of "Y" shape being secured in the two coupling holes of said another rotatable fiber holder respectively.

2. The two-channel fiber optic rotary joint of claim 1, wherein one each of said first and second "Y" shaped plastic optical fiber bundle assemblies further comprising:

a piece of larger-core plastic optical fiber with front portion and end portion; and wherein said front portion being secured in the center of said "Y" shaped plastic optical fiber bundle assembly on the bottom side of "Y" shape and said end portion being secured on the first top side of said "Y" shape;

a group of smaller-core plastic optical fibers with front side and back side, wherein said front side being circumferentially arranged around the peripheral space of the said front portion of said larger-core plastic optical fiber on the bottom side of "Y" shape and said back side being secured on the second top side of said "Y" shape; and a piece of coupling plastic optical fiber with larger-core with inside portion and outside portion, wherein said inside portion being secured in the second top side of said "Y" shape and facing oppositely with the back side of said group of smaller-core plastic optical fibers and the said outside portion being protruded out of the said second top side of said "Y" shape.

3. The two-channel fiber optic rotary joint of claim 2, wherein further comprising:

a first channel of light path having said larger-core plastic optical fibers co-axially fixed in said holders respectively;

a light signal from one of said larger-core plastic optical fiber directly coupled into another larger-core plastic optical fiber; and a second channel of light path including said 2 groups of smaller-core plastic optical fibers and said 2 pieces of coupling plastic optical fibers, wherein the light signal emitted from one of the said coupling plastic optical fiber will be coupled to the back side of the first group of small-core plastic fibers in one of said coupling hole of said one of the holders then dynamically coupled into second group of smaller-core plastic fibers on the front sides of the larger-core fiber and finally from the back side of the second group of small-core plastic fibers coupled into another large-core coupling fiber in the coupling hole of another fiber holder.

* * * * *